United States Patent

[11] 3,540,462

| [72] | Inventor | Nicholas A. Renzi<br>Trumbull, Connecticut |
|---|---|---|
| [21] | Appl. No. | 749,837 |
| [22] | Filed | Aug. 2, 1968 |
| [45] | Patented | Nov. 17, 1970 |
| [73] | Assignee | Avco Corporation<br>Stratford, Connecticut<br>a corporation of Delaware |

[54] MINIATURIZED FLOW CONTROL VALVE
6 Claims, 3 Drawing Figs.

[52] U.S. Cl..................................... 137/219,
251/30
[51] Int. Cl..................................... F16k 1/12
[50] Field of Search.......................... 137/222,
221, 220, 219; 251/30

[56] References Cited
UNITED STATES PATENTS
1,723,359  8/1929  Larner.......................... 137/222

| 2,679,856 | 6/1954 | Gerritsen et al. | 137/221 |
|---|---|---|---|
| 2,965,350 | 12/1960 | Knaebel et al. | 251/30 |
| 2,969,088 | 1/1961 | Kramer | 251/30X |
| 3,114,532 | 12/1963 | Gray et al. | 251/30 |
| 3,312,445 | 4/1967 | Trombatore et al. | 251/30 |

FOREIGN PATENTS
901,783  11/1969  France.......................... 251/30

Primary Examiner—M. Cary Nelson
Assistant Examiner—Michael O. Sturm
Attorneys—Charles M. Hogan and Gary M. Gron ABSTRACT: The disclosure illustrates a miniaturized solenoid-actuated fluid flow control valve. A miniaturized solenoid is mounted in a housing surrounded by the fluid stream and is adapted to directly actuate a normally retracted piston, telescoped into the housing, to a closed position for low flow rates. The solenoid actuates a pressure control means at high flow rates to establish pressure differentials across the piston for urging it to a closed position.

Patented Nov. 17, 1970 3,540,462
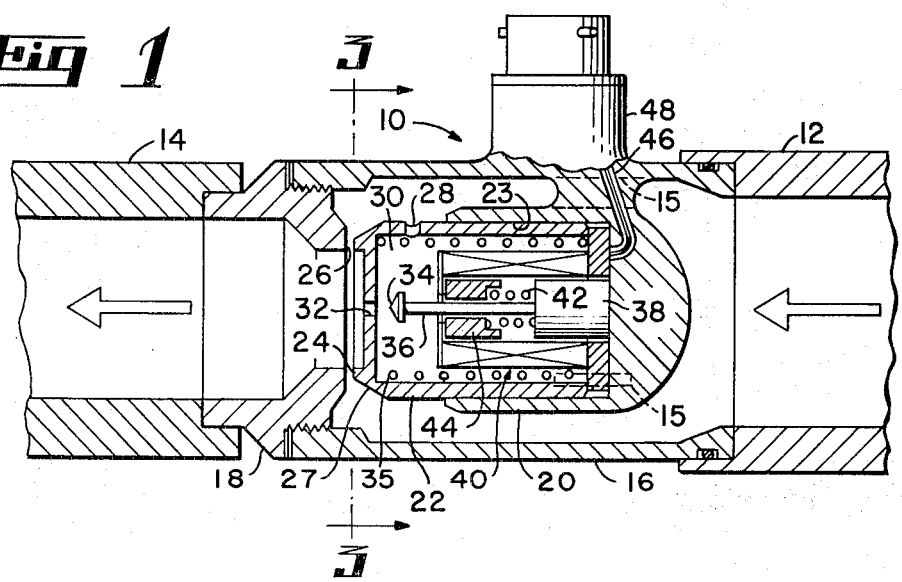
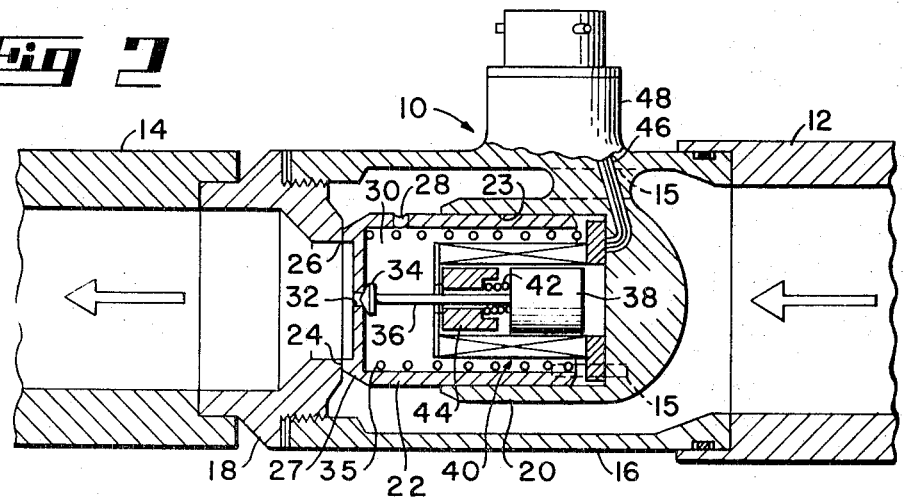
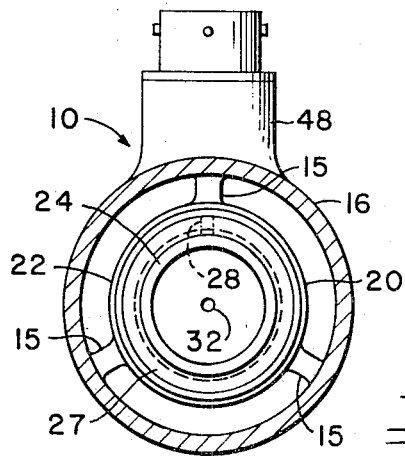
INVENTOR.
NICHOLAS A. RENZI
BY
ATTORNEYS.

3,540,462

MINIATURIZED FLOW CONTROL VALVE

The present invention relates to flow control valves and more specifically to solenoid-actuated valves.

The solenoid-actuated valve has found wide use in controlling flow of fluid because of the relative ease with which the solenoid may be energized from a remote location. Typical examples for a flow control valve of this type may be found in the control system of a gas turbine engine adapted to power helicopters. In these engines, weight and space are at an absolute premium and it is common objective to miniaturize a valve to the highest degree possible while still maintaining its flow control function.

One example of an extremely effective way of miniaturizing a solenoid-actuated valve may be found in the copending U.S. Pat. application Ser. No. 710,307, entitled "Flow Control Valves", in the name of Renzi and assigned to the same assignee as the present invention. In that application a miniaturized solenoid is positioned in a housing completely surrounded by a fluid stream whose flow is controlled by the valve. The solenoid actuates a means to selectively establish pressure differentials across a piston telescoped into the housing to displace it between open and closed positions. This valve is quite effective in controlling the flow of a fluid for moderate or high flow rates. One problem, however, does exist at relatively low flow rates. During these conditions there may be insufficient pressure drops across the piston to enable a displacement between the closed and open position.

Accordingly, it is an object of the present invention to provide a valve assembly similar to the assembly described above, which provides an effective flow control for a fluid stream having a wide range of flow rates and especially including relatively low rates.

In one aspect of the present invention the above ends are achieved by a valve assembly for controlling the flow of a fluid stream having a wide range of flow rates. The valve assembly comprises a housing mounted in and surrounded by the fluid stream. A piston means is supported by the housing and is displaceable between a first position for permitting fluid flow and a second position for blocking flow. A means is carried by the piston means for selectively directing fluid from the stream to opposite sides of the piston to establish pressure differentials thereacross, thereby displacing the piston means between the first and second positions. A solenoid means is positioned in the housing for actuating the fluid-directing means during high flow rates and for positively displacing the piston means during relatively low flow rates.

The above and other related objects and features of the present invention will be apparent from a reading of the description of the disclosure shown in the accompanying drawings and the novelty thereof pointed out in the appended claims.

In the drawings:

FIG. 1 is a longitudinal section view of a miniaturized flow control valve embodying the present invention, the valve being shown in an opened position;

FIG. 2 is a longitudinal section view of the flow control valve of FIG. 1 shown in a closed position; and FIG. 3 is a cross-sectional view taken on lines 3–3 of FIG. 1.

There is shown in FIG. 1 a valve assembly generally indicated by reference character 10, which is adapted to control the flow of fluid from a conduit 12 to a downstream conduit 14. The valve assembly 10 comprises a generally annular outer housing 16 suitably secured to conduit 12 and extending to a generally annular threaded-on downstream portion 18, secured to conduit 14. A plurality of integral radial struts 15 (See FIG. 3) extend from the outer housing 16 to a generally cylindrical bullet-nose housing 20, supported in and surrounded by the fluid stream flowing through the valve 10.

A hollow piston 22 is telescoped into a bore 23 in the downstream end of housing 20. The piston 22 is retractable to an open position (illustrated in FIG. 1) and extendible to a closed position (shown in FIG. 2) wherein an annular seat 24 on the downstream end of the piston abuts annular seat 26 on the downstream housing 18 of the valve assembly 10. The piston 22 has a generally annular radially extending surface 27 on its downstream side. The surface 27 is positioned so that when the piston 22 is against the seat 26, the surface 27 is exposed to fluid pressures upstream of the seat 26 that act in a direction tending to retract the piston 22. A spring 35 is positioned to act against the interior side of the piston 22 to bias it to an extended position for blocking flow.

The piston 22 has a relatively small radial inlet port 28 which opens the fluid stream upstream of the seat 26 to the interior side 30 of the piston 22. A centrally positioned larger area outlet port 32 connects the interior side 30 of the piston 22 to the downstream portion of the valve assembly 10. The flow of fluid from the upstream to the downstream portion of the valve 10 is controlled by a poppet 34 which is displaceable against the outlet port 32. The poppet 34 is displaced by a shaft 36 which extends from the plunger 38 of a miniaturized solenoid 40. As herein shown, the plunger 38 of the solenoid 40 is biased in a position which maintains the poppet 34 away from the port 32. A spring 42 acts on the plunger 38 and a stop 44 to maintain the plunger in this position. The solenoid 40 is actuated through electrical leads 46 extending to a suitable connector 48 for connection with an essential source of electrical power.

In operation, when the solenoid 40 is deenergized, as shown in FIG. 1, fluid flows around the housing 20, between the seats 24 and 26 to the conduit 14. During this condition the fluid pressures upstream of the annular throat formed by seats 24, 26 act on the radially extending surface 27 of the piston and the pressures downstream of the throat act on the downstream end of the piston bounded by the seat 24. The force of the spring 35 and the fluid pressure in the interior side 30 of the piston 22 act in opposition to the closing forces. The interior piston pressure is generally substantially lower than the upstream pressure due to the pressure drop across the relatively small area of the inlet port 28. As a result, the resultant forces maintain the piston 22 in its retracted position to permit flow.

When it is desired to close the valve 10 to block flow, the solenoid 40 is energized by connecting a suitable source of electricity to the solenoid leads 46 through the connector 48. This causes the plunger 38 to extend the shaft 36 and seat the poppet 34 against the outlet 32 in the piston 22. The flow from the port 32 is thereby blocked and the pressure on the interior side 30 of the piston 22 builds up to substantially the upstream fluid pressure in the valve 10. The closing fluid pressure force thus generated on the interior side 30 of the piston 22 overcomes the forces generated by the upstream pressures acting on the ring 27 and the downstream pressures acting within the bounds of the seat 24 to extend the piston 22 against the seat 26, as shown in FIG. 2. In this condition the piston 22 remains against the seat 26 as long as the upstream fluid pressure is maintained on the interior side 30 of the piston 22 by blocking flow through port 32. The spring 35 is used to provide an additional closing force. However, its spring constant should be at a low enough level to enable opening of the valve at low flow rates.

The above closing forces are described for flow rates ranging from a moderate to a very high level. However, at relatively low fluid flow rates when it is desired to move the piston from the position of FIG. 1 to that of FIG. 2, the pressure drop across the seats 24 and 26 may be insufficient to enable a resultant closing force even when the flow through the outlet 32 is blocked and upstream pressure is on the interior side 30 of piston 22. As a result, the force tending to act to hold the piston 22 retracted may substantially equal the resultant force on the interior side 30 of the piston 22 acting to extend it. The force balance thus established tends to hold the piston in a retracted position and the spring force may be generally insufficient to extend the piston due to frictional forces acting on piston 22.

It is for this reason that the poppet 34 and the shaft 36 of the solenoid 40 are adapted to engage the port 32 in a direction tending to extend the piston 22 to the position of FIG. 2. For relatively low flow rates the solenoid therefore positively extends the piston 22 to its closed position to ensure an effective flow control for extremely low flow rates.

When it is desired to again open the valve, the solenoid 40 is deenergized, thus displacing the plunger 34 from the port 32 to depressurize the interior side 30 of the piston 22 and allow the pressure acting on surface 27 of the piston to urge it to a retracted position, as shown in FIG. 1.

The valve assembly described above is capable of a high degree of miniaturization because the solenoid is mounted within the valve and acts to control fluid pressure forces to displace the piston 22 between open and closed positions for high flow rates. The size of the solenoid therefore may be minimized because the only force necessary from the solenoid 40 for high flow rates is that necessary to move poppet 34 which controls the flow of fluid through the piston outlet port 32. However, for low flow rates wherein the forces established by the fluid flow may be insufficient to close the valve, the solenoid acts directly on the piston. In this case the forces acting in opposition to the solenoid are negligible and thus enable a minimum solenoid size. The spring 35 enables and even greater degree of miniaturization because it aids the solenoid 40 by positively extending the piston 22 to a closed position.

While the preferred embodiment of the present invention has been described, it is apparent to those skilled in the art that the valve assembly described is capable of modifications without departing from the spirit of the present invention. Therefore its scope is to be determined solely by the appended claims.

I claim:

1. A valve assembly for controlling the flow of a fluid stream having a wide range of flow rates, said valve assembly comprising:
   a housing mounted in and surrounded by said fluid stream;
   piston means supported by said housing and displaceable between a first position for permitting fluid flow and a second position for blocking flow;
   means carried by said piston means for selectively directing fluid from said stream to opposite sides of said piston to establish pressure differentials thereacross, thereby displacing said piston means between said first and second positions; and
   solenoid means positioned in said housing and having a plunger for actuating said fluid-directing means during high flow rates and for positively displacing said piston means in response to energization of said solenoid means during relatively low flow rates.

2. A valve assembly as in claim 1 wherein:
   said piston means is hollow and has an open end thereof telescoped into said housing and is respectively extendible and retractable to a closed position and an open position;
   said solenoid means has a displaceable member adapted to actuate said fluid-directing means in a direction to extend said piston means; and
   said solenoid means is positioned so that it is substantially surrounded by the interior side of said hollow piston when said piston is in its retracted position whereby the axial length of said valve assembly is minimized.

3. A valve assembly as in claim 2 wherein:
   said piston means is extendible in a downstream direction;
   said selective fluid-directing means comprises means for providing a flow path from the fluid stream through said piston means to the interior side of said piston means and the downstream side thereof and valve means displaceable into said flow path for selectively terminating and permitting flow through said flow path, thereby establishing pressure differentials across said piston means; and
   the displaceable member of said solenoid means is adapted to displace said valve means.

4. A valve assembly as in claim 3 wherein:
   said fluid stream is surrounded by a generally annular housing having an annular seat downstream of said piston means;
   said piston means is extendible against said seat for terminating flow, and said piston means has a generally annular, radially extending surface positioned so that when said piston means engages said seat to block flow the upstream pressure of said fluid stream acts in a direction tending to retract said piston means;
   said flow path means comprises an inlet for connecting the upstream portion of said fluid stream to the interior of said piston means and an outlet connecting the interior of said piston means to the fluid stream downstream of said piston means when it is extended against said seat;
   said valve means is displaceable by said solenoid means to selectively block flow through one of said ports; and
   the interior side of said piston means and said radially extending surface having effective areas relative to one another so that when flow from the upstream through the interior to the downstream end of said piston means is permitted, the upstream fluid pressure acting on said generally radial surface acts against the fluid pressure acting on the interior of the piston means to retract said piston means and when the flow from the upstream to the downstream end is terminated the pressure acting on the interior of said piston means acts against the pressure acting on said radial surface to extend the piston means to a closed position.

5. A valve assembly as in claim 4 wherein:
   the inlet on said piston means has a relatively small opening and is continuously exposed to the fluid stream upstream of said seat; and
   said valve means comprises a poppet connected to the displaceable member of said solenoid and adapted to selectively engage said outlet for selectively controlling flow through said piston means and positively urging said piston means to a closed position for relatively low flow rates.

6. A valve assembly as in claim 5 further comprising: spring means acting against said housing and the interior of said piston means for urging said piston means to an extended position whereby the size of the solenoid required to control flow through said piston means and to positively displace said piston means is minimized.